United States Patent [19]
Brewer et al.

[11] Patent Number: 5,933,857
[45] Date of Patent: Aug. 3, 1999

[54] ACCESSING MULTIPLE INDEPENDENT MICROKERNELS EXISTING IN A GLOBALLY SHARED MEMORY SYSTEM

[75] Inventors: Tony M. Brewer; Kenneth Chaney; Roger Sunshine, all of Plano, Tex.

[73] Assignee: Hewlett-Packard Co., Palo Alto, Calif.

[21] Appl. No.: 08/845,306

[22] Filed: Apr. 25, 1997

[51] Int. Cl.$^6$ ............................ G06F 12/00; G06F 12/02; G06F 12/10

[52] U.S. Cl. ...................... 711/202; 711/153; 711/147; 711/141; 711/210; 711/170; 711/209

[58] Field of Search ................................. 395/412, 425, 395/68; 711/147, 149, 150, 151, 153, 202, 206, 209, 210, 170

[56] References Cited

U.S. PATENT DOCUMENTS

| | | | |
|---|---|---|---|
| 5,388,242 | 2/1995 | Jewett ..................................... | 711/113 |
| 5,590,301 | 12/1996 | Guenthner et al. ..................... | 711/202 |
| 5,682,512 | 10/1997 | Tetrick ................................... | 711/202 |
| 5,771,383 | 6/1998 | Magee et al. ........................... | 395/680 |

*Primary Examiner*—Eddie P. Chan
*Assistant Examiner*—Kimberly McLean

[57] ABSTRACT

Microkernel memory references, traditionally required to refer to memory by exact physical address, are transformed so as to be able to map the references to addresses in multiple memory nodes. As a result, each node's address space may be compiled to by multiple microkernels. Reverse mapping responsive to coherency requests facilitates cache coherency.

8 Claims, 3 Drawing Sheets

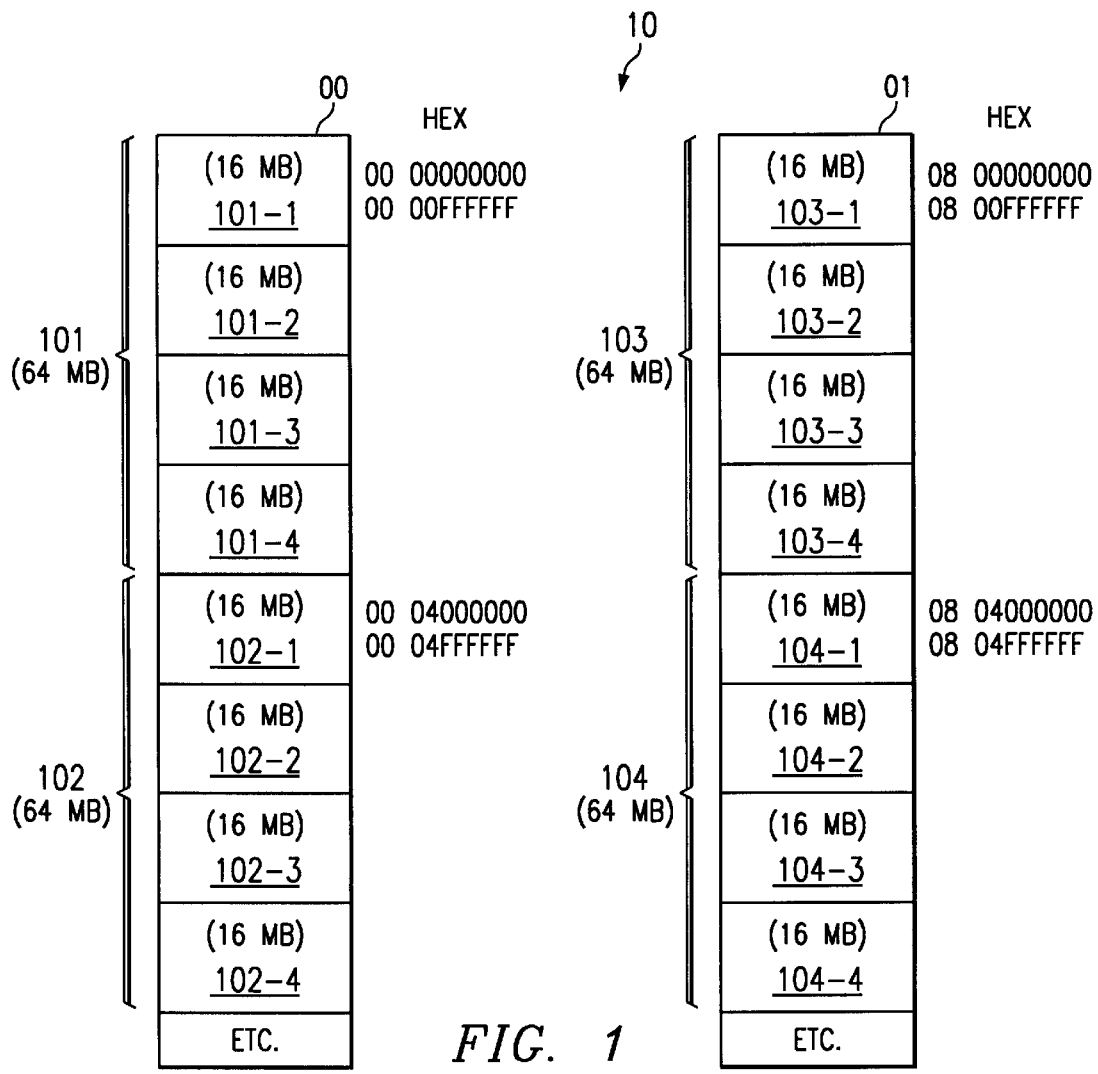
FIG. 1
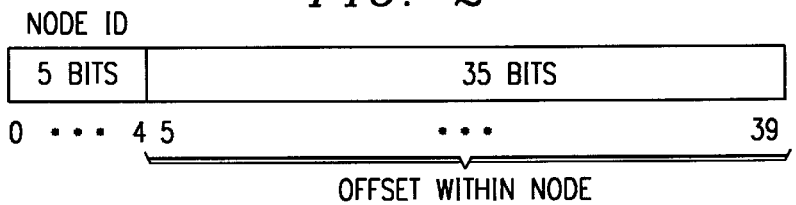
FIG. 1A
FIG. 2

ACCESSING MULTIPLE INDEPENDENT MICROKERNELS EXISTING IN A GLOBALLY SHARED MEMORY SYSTEM

Tony M. Brewer 5225 Mariners Drive Plano, Tex. 75093 Citizenship: U.S.A.

Kenneth Chaney 6549 West Medalist Plano, Tex. 75023 Citizenship: U.S.A.

Roger Sunshine 2005 Cherbourg Drive Plano, Tex. 75075 Citizenship: U.S.A.

TECHNICAL FIELD OF THE INVENTION

This invention relates generally to management of globally shared memory in a general purpose computer, and more specifically to allowing different software kernels loaded on different memory nodes to be accessed concurrently by multiple processors and without translation tables or temporary storage.

BACKGROUND OF THE INVENTION

On shared memory systems using globally shared memory, one address space is generally provided for an entire system. Within this space, multiple independent hardware nodes are each allocated a unique series of addresses in physical memory. These independent hardware nodes each have loaded thereon a corresponding microkernel of the operating software ("OS") being used on the system.

A microkernel will be understood to be the lowest level of OS in a system. Microkernels load and execute in physical memory because they are the applications that run all of the virtual memory. Physical memory does not have a map; as noted above, it is a specifically identified memory region having a unique address space for each node. Each microkernel is compiled as a regular program, and all memory references are therefore made to absolute addresses in the unique address space of physical memory. Therefore, when the microkernel loads into memory, it must do so at the exact memory address compiled to in the microkernel.

Note that the option to use relocatable addressing with microkernels is known in the art. This method is far from optimal, however, and is thus generally avoided. This method invokes a non-standard mode of execution in which processing takes more time and is generally less efficient. Further, use of the method requires a less stable compiler strategy that potentially may cause additional software errors in execution. Thus, it has always been preferable to use non-relocatable memory references (i.e. absolute addressing) when dealing with microkernels.

Most applications running on an OS do not have to endure this inflexibility, because each application has its own virtual address space and so just about any address can be mapped to serve the application's particular memory references.

Microkernels, however, are atypical in that they are not disposed to have this feature. When a microkernel is loaded into physical address space, there is no map and so it has to be loaded into the actual addresses specified. And since the physical address space for a system comprises a series of unique addresses for each node, a memory management problem occurs when microkernels loaded on to different nodes are desired to be shared between several processors.

A need in the art has therefore arisen for a mechanism where each node has its own region of physical memory and yet its address space may be compiled to by multiple microkernels. Further, at the same time, the combined entire address space must cooperate to enable a globally shared memory system for user applications.

Current systems in the art enable physical memory address space to be compiled to by multiple microkernels through the use of cumbersome translation tables and requiring the use of temporary storage registers. Processing of these tables through additional storage registers incurs measurable wasted processor time. There is therefore a need in the art to enable microkernels to appear to simultaneously share physical address space "on the fly," without the need for temporary storage or wasted processor time, and in a cache-coherent environment.

SUMMARY OF THE INVENTION

These and other objects, features and enhancements will be achieved by our invention in which a mechanism is disposed to detect when a processor makes a memory request to access a predetermined region of physical memory in which a microkernel is loaded. The access is then mapped to the unique address range for the node in which the microkernel is loaded. This identification mapping and routing process is enabled "on the fly" by analysis of the condition of bits in the address to which the access is directed. Further, when references from other processors concurrently return the information or try to access the microkernel from the mapped region, the information is reverse mapped back to "node zero" to enable processing in a cache coherent manner.

Illustrating the invention more specifically, let it be assumed that a processor makes a reference to a region of memory in which a microkernel may be expected to be loaded, typically either the first 16 MB subsegment or the fifth 16 MB subsegment in a node that has been divided into 64 MB segments. The present invention detects such processor references "on the fly" and maps them to the first 16 MB subsegment and the fifth 16 MB subsegment of memory in the node in which the desired microkernel is loaded. This allows each node's processors to access the microkernel loaded onto that processor's node.

This principle is then augmented to allow other nodes or other processors to work in a cache coherent environment on that node. The present invention detects coherency traffic sent by a second processor to a first processor that encached regions of memory mapped according to the present invention. That coherency traffic is then automatically mapped back to the original physical memory address space that the first processor used, and before it is sent back to the first processor to do an invalidate or flush type of operation. This enables the second processor to identify address space mapped according to the present invention as space that is in its cache, thus allowing cache coherent operations to exist within the node, yet preserving the capability of loading microkernels on a per node basis.

It is therefore a technical advantage of the present invention to enable access by processors to multiple microkernels on a shared basis, without the need for translation tables and associated interim storage requirements. Processing of microkernel references in a shared environment is thereby optimized.

It is a further technical advantage of the present invention to enable said access in a cache coherent environment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates an exemplary memory address layout for two memory structures 00 and 01, each corresponding to nodes 00 and 01.

FIG. 1A is an exemplary "load word" instruction in microkernel code making reference to an exact address in physical memory.

FIG. 2 is an exemplary bit layout of a 40-bit memory reference used to illustrate the present invention.

DESCRIPTION OF THE PREFERRED EMBODIMENTS

Figure 3:
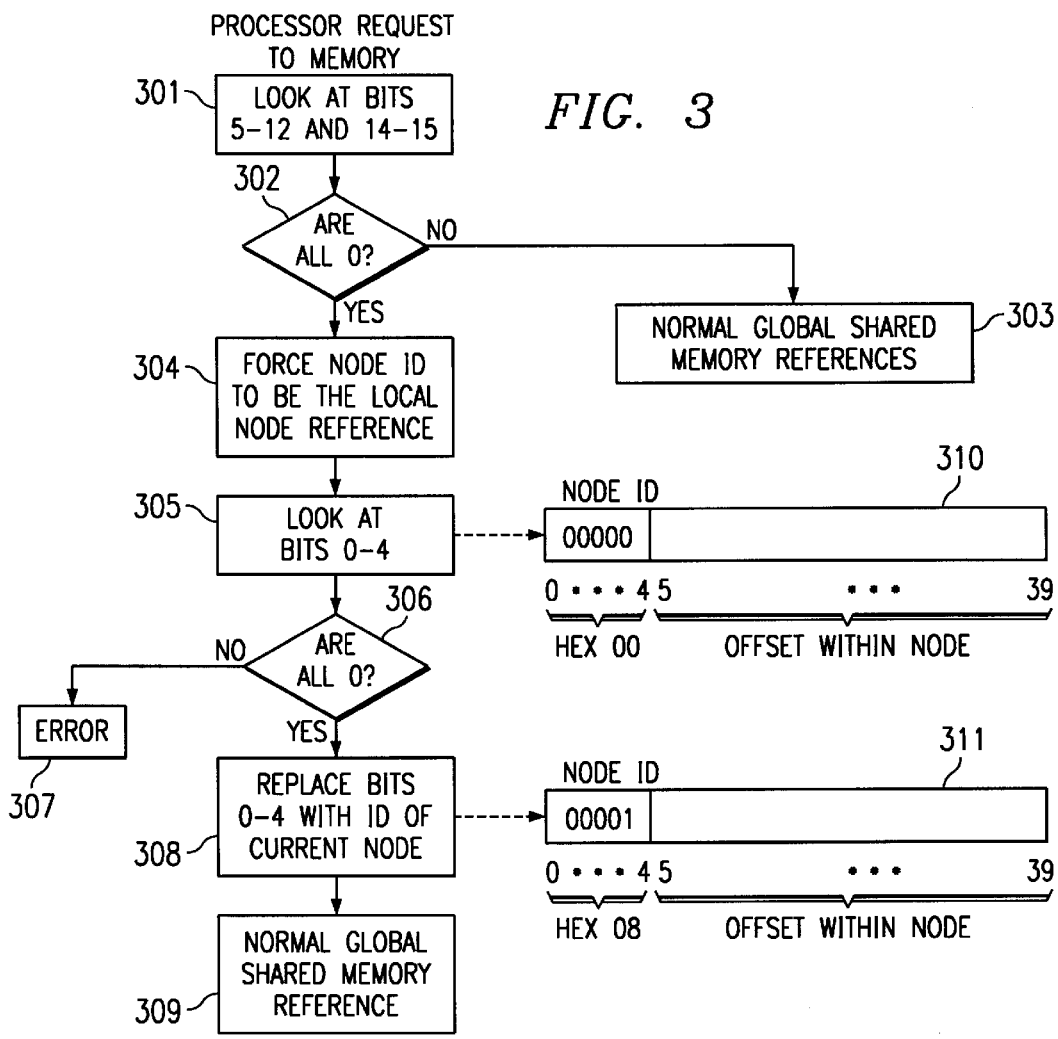
FIG. 3 is a flow diagram illustrating exemplary logic used in processing a memory request in accordance with the present invention.

FIG. 1 illustrates a portion of physical memory 10 having two memory structures 00 and 01 allocated to two corresponding nodes having node identifiers ("Node IDs") 00 and 01. Each node has a unique address range.

In the example of the preferred embodiment described herein, each node is divided into 64 MB segments each having four 16 MB subsegments, although it will be understood that the present invention also applies to memory structures configured differently. On FIG. 1, the first two 64 MB segments of memory structure 00 are labelled 101 and 102, and the first two 64 MB segments of memory structure 01 are labelled 103 and 104. Each 64 MB segment is divided up into four subsections each having a subsegment of 16 MB. For segment 101, these lines are labelled 101-1, 101-2, 101-3 and 101-4. For segment 102, these lines are labelled 102-1, 102-2, 102-3 and 102-4, and so on. Each line contains a series of uniquely-addressed memory locations based on a 40-bit reference. For example, line 101-1 has addresses 00 00000000 through 00 00FFFFFF (as expressed in hexadecimal, or "hex"), line 102-1 has addresses 00 00000000 through 00 04FFFFFF, line 103-1 has addresses 08 00000000 through 08 00FFFFFF, and so on.

The relationship between the node ID and physical memory addresses illustrated on FIG. 1 is explained with reference to FIG. 2 and with further reference to Table 1 below. It should be first re-emphasized, however, that the following relationships are exemplary only, and that the present invention applies equally to memory structures organized in other ways. FIG. 2 illustrates the bit layout of a 40-bit word used as a memory address. The node ID is located in the most significant five bits (i.e. bits 0–4), as is common in the art. The remaining 35 bits (bits 5–39) identify a precise physical memory address within that node by stating the offset (from node zero) of physically contiguous memory within the node at which the address can be found. The fourteenth bit (i.e. bit 13) is also of significance in this embodiment of the present invention, in that a "1" in this bit identifies that a particular memory address is in at least the fifth 16 MB subsegment from node zero (i.e. the fourth 16 MB subsegment offset). This is because the fourteenth bit represents 64 MB of offset from node zero.

With reference now to Table 1 below, it will be appreciated that the 40-bit word of FIG. 2 may also be represented as a 10-character hex word. Table 1 also refers to FIG. 1 to further illustrate the exemplary memory structure used in the present invention. Thus, it will be seen from Table 1 that the node ID is located in the first five bits (i.e. bits 0–4), and that when bits 5–12 and bits 14–15 are all zero, the address is either to the first or fifth 16 MB subsegments in a node (i.e. to the 16 MB subsegments with either zero of four 16 MB subsegments of offset).

TABLE 1

| 16MB subsegment on FIG. 1 | Node ID | 16MB subsegment offset | Initial Memory Location | |
|---|---|---|---|---|
| | | | Hex | Binary |
| 101-1 | 00 | Zero | 00 00000000 | 0000 0000 0000 0000 etc. |
| 101-2 | 00 | One | 00 01000000 | 0000 0000 0000 0001 etc. |
| 101-3 | 00 | Two | 00 02000000 | 0000 0000 0000 0010 etc. |
| 101-4 | 00 | Three | 00 03000000 | 0000 0000 0000 0011 etc. |
| 102-1 | 00 | Four | 00 04000000 | 0000 0000 0000 0100 etc. |
| 103-1 | 01 | Zero | 08 00000000 | 0000 1000 0000 0000 etc. |
| 104-1 | 01 | Four | 08 04000000 | 0000 1000 0000 0100 etc. |
| Not illustrated | 02 | Zero | 10 00000000 | 0001 0000 0000 0000 etc. |
| Not illustrated | 02 | Four | 10 04000000 | 00001 0000 0000 0100 etc. |

It will be further understood to be traditional in microprocessor technology to load microkernels into memory nodes starting address node zero. By convention, the statically allocated portion of a microkernel generally never exceeds 32 MB in size, and so the first 16 MB of the microkernel is loaded into the first 16 MB subsegment of the node, i.e. the 16 MB subsegment containing address node zero. If the microkernel exceeds 16 MB in size, the remainder is loaded, by convention, into the fifth 16 MB subsegment in the node (i.e. the first 16 MB subsegment in the second 64 MB segment in the node, or with reference to Table 1 above, the 16 MB subsegment with four 16 MB subsegments of offset).

The present invention may thus recognize a processor making a microkernel memory reference by analysis of the bit layout of the address being referred to. If bits 5–12 and 14–15 are all zero, the reference must be to the 16 MB subsegment either at offset zero or at offset four thereof in a node. This is where microkernels are loaded in a node. The invention then translates the node ID (which should be 0 since it has already been determined that this is a microkernel reference) to the node ID of the node to which the processor is currently referring. The microkernel reference may then be treated like any other normal globally shared memory reference.

Cache coherency is enabled by reverse-mapping. When a first processor sends a coherency request to a second processor in which a microkernel reference is made, a problem will arise if the second processor has previously translated the node ID of the microkernel reference from node 00 to the current node. The node ID must therefore be translated back to 0 before the coherency request can be processed. Again, therefore, a microkernel reference may be recognized in a coherency request by analyzing bits 5–12 and bits 14–15 as above. If a reference is identified as to a microkernel, the node ID is translated back to 0 before sending the coherency request to the processor.

It will be appreciated that all of the foregoing logic may be executed "on the fly," without having to use tables and temporary storage registers as is currently practiced in the art. The potential optimizations of processing time and temporary storage are self-evident.

FIG. 1A further assists in illustrating the problem solved by the present invention. FIG. 1A shows a simple load word instruction to the compiler as might typically be used in microkernel code, telling the compiler to load the value found at the specific memory address 00 00000000 into register 2. The function of the instruction is to load the value found in a node's first memory address into register 2. But because this is microkernel code, absolute memory addresses have to be used. Now, with further reference to FIG. 1, if this microkernel happened to be loaded into node 00, the system would be able to execute this instruction correctly since 00 00000000 is the exact address of the node's first memory address. However, if this microkernel was loaded into node 01, the system would not be able to execute this instruction correctly. The exact address of node 01's first memory address is in line 103-1 at address 08 00000000. FIG. 1A, however, requires a load from address 00 00000000. A translation is required. Thus, in order to enable a multi-node system to share microkernels properly, the present invention transforms node ID addresses in microkernel memory references so that they "believe" that processors are referring to microkernels in their own precisely-addressed physical space, when in fact, they have been "transparently" mapped to another node's memory space.

Figure 4:
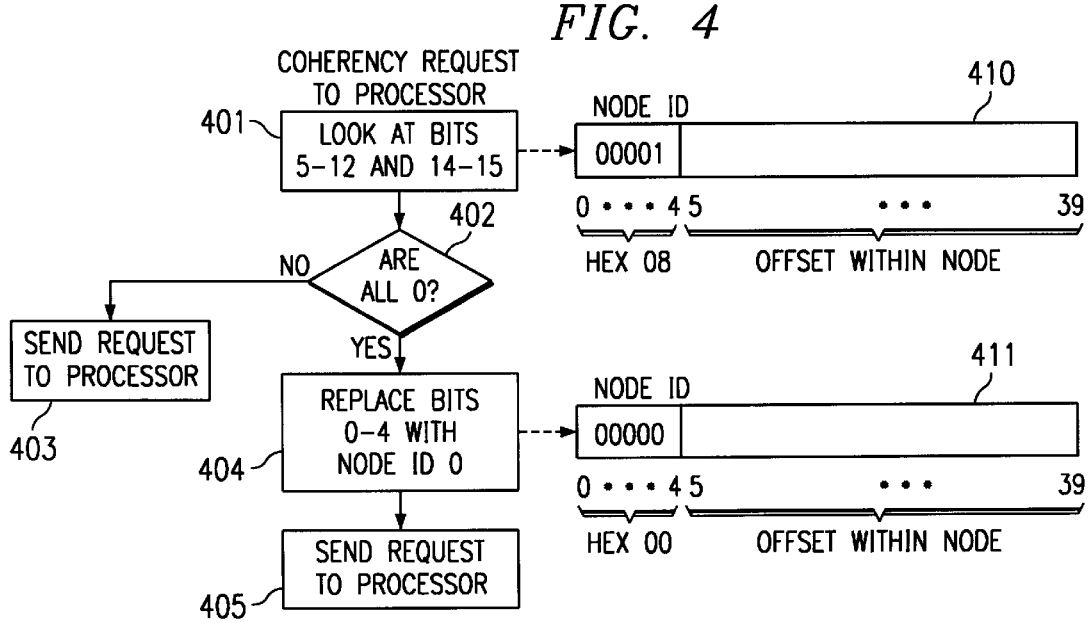
FIG. 4 is a block diagram illustrating exemplary logic used in processing a coherency request in accordance with the present invention.

FIG. 3 illustrates exemplary logic under the present invention to enable a processor request to memory as described above. FIG. 4 illustrates exemplary logic under the present invention to enable a coherency request to a processor as described above.

Turning first to FIG. 3, entitled "Processor Request to Memory," blocks 301 and 302 first check the address of a memory reference to see if bits 5–12 and bits 14–15 are all the value 0. If they are all the value 0, then it may be validly deduced that the memory reference is to either the first 16 MB subsegment or the fifth 16 MB subsegment in a node, thereby indicating that the memory reference is being made to a microkernel.

On the other hand, if the check in blocks 301 and 302 fails, then it may be validly deduced that a normal global shared memory reference has been made to a location other than where a microkernel may be expected to have been loaded (block 303). Normal memory-mapping functionality will then serve the needs of the reference to enable the code to run correctly.

Returning to blocks 301 and 302 on FIG. 3, if bits 5–12 and bits 14–15 are all 0, a node ID translation forces the memory reference to refer to the node in which the microkernel being referred to has been loaded (block 304). For example, looking back at FIG. 1, if the microkernel being referred to is loaded into node 01, then the node ID in block 304 translation will force a corresponding reference to that node.

This forced node ID translation is accomplished by proceeding on FIG. 3 to blocks 305 and 306. First, address bits 0–4 are examined to check that they are all 0. Under the present invention, they must by definition be all 0 at this stage of the process because the original reference has already been determined to have been made to a microkernel. Indeed, if blocks 305 and 306 determine that address bits 0–4 are not all 0, block 307 identifies that an error has been detected and software must be corrected. Assuming, however, that these bits are all 0, block 308 then replaces those bits 0–4 with the ID of the node in which the microkernel referred to has been loaded. The microkernel memory reference may then be treated as any other normal global shared memory reference (block 309).

Blocks 310 and 311 on FIG. 3 illustrate this transformation further. Block 310 shows an exemplary microkernel memory reference that has passed blocks 301 and 302 because bits 5–12 and 14–15 are all 0. It will be further seen that as expected for this type of memory reference, bits 0–4 are also all 0. Let it now be assumed, however, that the reference is to a microkernel loaded in node 01 as illustrated in FIG. 1. Thus, the node does not contain the exact physical address 00 00000000 as referred to by the memory reference. Moving on to block 311, the transformation of blocks 305, 306 and 308 is made, replacing the node ID in bits 0–4 with the node to which the microkernel corresponds. In the example illustrated on FIG. 3, this is the value 00001, which in hexadecimal, including the 3 most significant bits of the offset within the node, results in hex value 08.

Referring momentarily back to FIG. 1, this hex value 08 corresponds to the leading 08 as referred to in node 01, meaning that the memory reference in FIG. 3 is referring to 16 MB subsegment 103-1. Accordingly, the transformation has sent the memory reference to the correct node. Without the transformation, the reference would have been made to node 00 on FIG. 1. This would probably have caused a software error.

With reference now to FIG. 4, entitled "Coherency Request to Processor," a flow diagram illustrates exemplary logic enabling a coherency request including a microkernel reference from a first processor to a second processor according to the present invention. In FIG. 4, block 401 looks at bits 5–12 and 14–15, and block 402 checks to see if they are all 0. If they are, then a coherency request for a microkernel memory reference may be deduced, as explained above with reference to blocks 301 and 302 on FIG. 3. Processing continues to block 404. On the other hand, if bits 5–12 and 14–15 are not all 0, a coherency request to a normal globally-shared memory reference may be deduced, and the coherency request may be sent directly to the second processor without modification (block 403).

Proceeding to block 404 when bits 5–12 and 14–15 are all 0, it is now necessary to return the node ID value to all 0, as it was before the transformation illustrated in FIG. 3, in order to satisfy the coherency request accurately. Block 404 makes this transformation, and the request, as modified, is then sent back to the second processor (block 405).

The modification of the node ID value shown in FIG. 4 is further illustrated by example in blocks 410 and 411 on FIG. 4. Block 410 shows the memory reference as transformed in block 311 of FIG. 3. At this time, the node ID has the value 00001, referring to the hex value 08 and pointing to an address in line 103-1 on FIG. 1. Those bits are replaced in block 404 with the value 00000, as shown in block 411, which represents the hex value 0 and reflects the microkernel memory reference before the transformation of FIG. 3. Accordingly, the address is reverse-mapped back to a node 0 address, which the first processor is expecting and which will allow the coherency request to perform properly within the first processor's caches, since the first processor had originally made the request assuming it was referring to a node 0 address.

Figure 5:
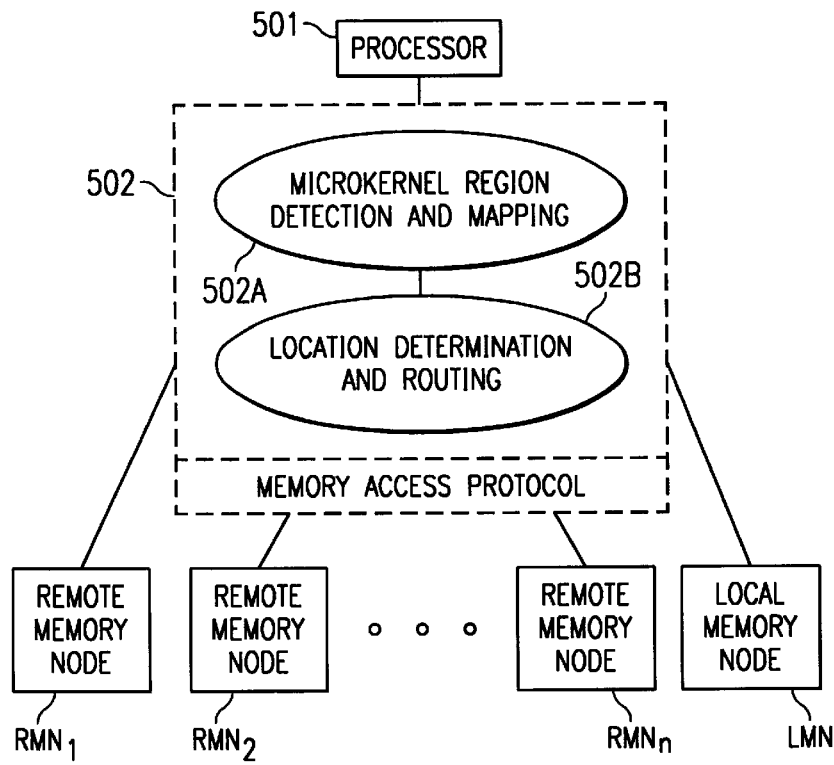
FIG. 5 is a block diagram illustrating, at a functional level, exemplary architecture and topology on which the present invention may be enabled.

FIG. 5 illustrates, at a functional level, exemplary architecture and topology on which the present invention may be enabled. In most microprocessor systems operating in a globally shared memory environment, an individual processor 501 uses memory access protocol 502 to access a local memory node LMN, plus a plurality of n remote memory nodes $RMN_1$-$RMN_n$, also shared by other processors.

The present invention is advantageously enabled within memory access protocol 502. In this way, when processor 501 makes a memory request to a region of memory in which a microkernel is expected to be loaded, that event is recognized by microkernel region detecting and mapping function 502A. Once the mapping function is complete and the request is translated to refer to the node on which the desired microkernel is loaded, location determination and routing function 502B sends the request to local memory node LMN or remote memory nodes $RMN_1$-$RMN_n$, whichever is appropriate. In this way, microkernel references become a part of globally-shared memory rather than to specific address space.

Figure 6:
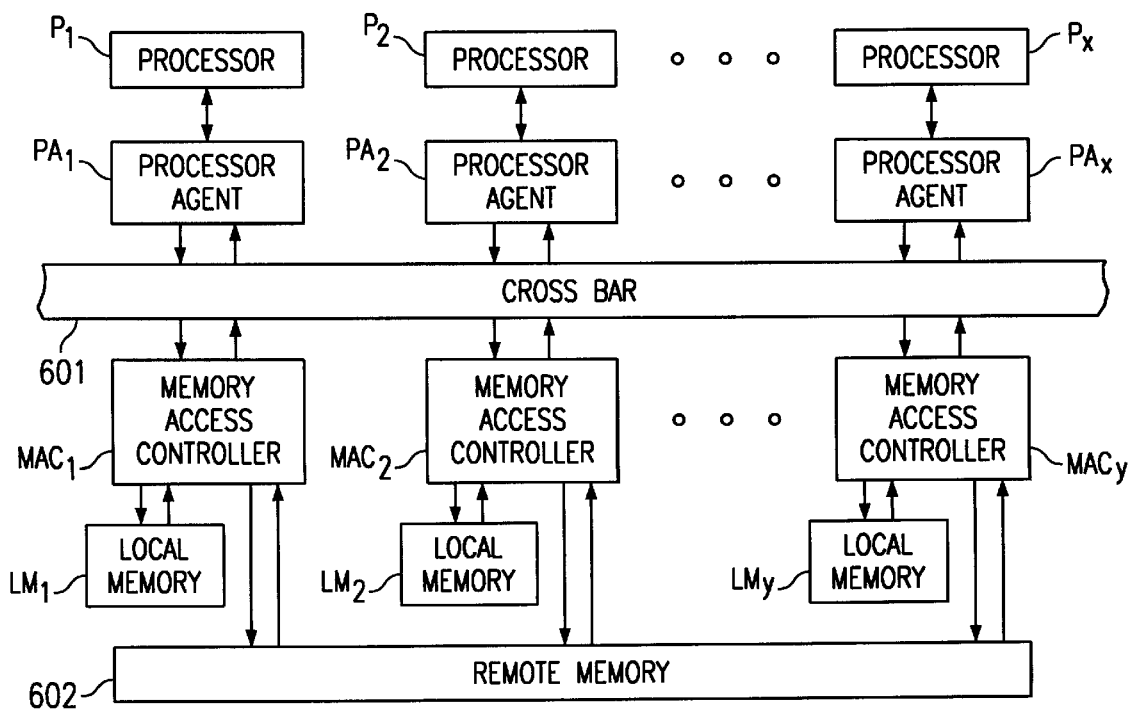
FIG. 6 is a block diagram illustrating, at a functional level, an exemplary implementation of the present invention in a multi-processor, multi-node environment.

FIG. 6 illustrates an exemplary implementation of the present invention according to an architecture and topology known in the art. In FIG. 6, processors $P_1$-$P_x$ operate concurrently, and in doing so have occasion to make memory references. These memory references are made via corresponding processor agents $PA_1$-$PA_x$ and over crossbar 601. The memory available to processors $P_1$-$P_x$ is structured into globally-shared remote memory structure 602 and a plurality of y local memory structures $LM_1$-$LM_y$. Access to all memory is controlled by memory access controllers $MAC_1$-$MAC_y$, each memory access controller governing a corresponding local memory space and concurrently accessing globally-shared remote memory 602.

In the example of FIG. 6, the present invention resides in processor agents $PA_1$-$PA_x$. In this way, as processors $P_1$-$P_x$ make microkernel references, the corresponding processor agent $PA_1$-$PA_x$ may detect this event, and perform mapping, location determination and routing functions to translate the reference, if necessary, to refer to the node on which the microkernel is loaded. The microkernel may thus be loaded on any part of the memory structure, whether in a local memory $LM_1$-$LM_y$ or in remote memory 602, and thus becomes accessible on a shared basis by all processors $P_1$-$P_x$ even though actual microkernel references are made by processors $P_1$-$P_x$ to physical address space at node 0.

Cache coherency is also enabled. When a first processor $P_1$ makes a cache coherency request to processor $P_2$ where that request includes a microkernel reference, processor agent $PA_1$ will of course translate that reference in accordance with the present invention as described above. However, it will also be recalled that the present invention is also resident on processor agent $PA_2$. The coherency request is identified and tested by processor agent $PA_2$ to see if it makes a microkernel reference. If it does, the node ID on the reference is translated back to node 0 so that processor $P_2$ can interpret the coherency request.

It will also be appreciated that in addition to FIG. 6, other implementation of architecture and topology enabling the present invention are possible. It will be further appreciated that the present invention may be enabled on software executable on a general purpose computer including processing units accessing a computer-readable storage medium and a memory (including cache memory and main memory).

Although the present invention and its advantages have been described in detail, it should be understood that various changes, substitutions and alterations can be made herein without departing from the spirit and scope of the invention as defined by the appended claims. In particular, it will be appreciated that exemplary use has been made of a memory structure illustrating just one configuration on which the present invention may be enabled. It will be seen that variables such as designated microkernel location and size, memory segment size, memory address word size and conventions for bit identity within said words may be changed without departing from the spirit and the scope of the invention.

What is claimed is:

1. A method for accessing microkernels in a globally shared memory system wherein the memory system is configured into a plurality of nodes of memory, the method comprising the steps of:

(a) predefining according to a first protocol a base node to be uniformly addressed by all processor reference to microkernels;

(b) predefining according to a second protocol an identifiable reserved address space on said nodes, said reserved address space to be used by said nodes to store microkernels therein;

(c) predefining the bit sequence of memory addresses pointed to by processor references to include (1) a destination node identifier and (2) a destination nodal address in said destination node;

(d) parsing the bit sequence of memory addresses pointed to by the processor memory references;

(e) recognizing said memory references as microkernel references when the destination nodal addresses thereof are in the address space reserved for storing microkernels in nodes under the second protocol; and (f) transforming the destination node identifiers for microkernel references to the identifiers of local nodes storing the corresponding microkernels to which the microkernel references refer.

2. The method of claim 1, further comprising the step of:

(g) transforming the local node identifier back to the destination node identifier prior to processing a cache coherency request to said processor;

wherein step (g) is performed subsequent to step (f) and in response to said cache coherency request.

3. The method of claim 1, further comprising the step of:

prior to step (f), reporting a program error if the destination node identifier of a microkernel reference does not identify the base node under the first protocol.

4. An improved method for enabling multiple processors to access a plurality of microkernels each loaded onto independent memory nodes, in which a first protocol predefines a base node to be uniformly addressed by all processor references to microkernels, and in which a second protocol predefines an identifiable reserved address space on said nodes, said reserved space to be used by said nodes to store microkernels therein, and in which the bit sequence of memory addresses pointed to by processor references is also predefined to include (1) a destination node identifier and (2) a destination nodal address in said destination node; and wherein the improvement comprises:

(a) parsing the bit sequence of memory addresses pointed to by processor memory references;

(b) recognizing said memory references as microkernel references when the destination nodal addresses thereof are in address space reserved for storing microkernels in nodes under the second protocol;

(c) reporting a program error if the destination node identifier of a microkernel reference does not identify the base node under the first protocol;

(d) transforming the destination node identifiers on microkernel references to the identifiers of local nodes storing the corresponding microkernels to which the microkernel references refer; and (e) transforming the local node identifier back to the destination node identifier prior to processing a cache coherency request to said processor, wherein step (e) is performed in response to said cache coherency request.

5. An improved processor agent disposed to make memory references over a crossbar to ones of a plurality of microkernels each stored on independent memory nodes, each node storing a microkernel according to a first protocol in identifiable reserved address space therein, and wherein the processor agent receives memory reference requests from a processor, ones of the requests referring to microkernels according to a second protocol requiring all microkernel references to address a common base node, the improvement comprising:

means for parsing (1) a destination node identifier and (2) a destination nodal address in said destination node out of the bit sequence of a memory address pointed to by a memory reference made by the processor;

means for recognizing a memory reference as a microkernel reference when the destination nodal address is in address space reserved for storing microkernels in nodes under the first protocol;

means for reporting a program error if the destination node identifier of a microkernel reference does not identify the base node under the second protocol;

means for transforming the destination node identifier on a microkernel reference to an identifier of a local node storing the microkernel to which the microkernel reference refers; and means for transforming the local node identifier back to the destination node identifier prior to processing a cache coherency request when said cache coherency request is made to said processor.

6. A computer program product including computer readable logic recorded thereon for enabling multiple processors to concurrently access microkernels stored in independent local memory nodes, wherein said nodes store microkernels in identifiable reserved address space therein, and wherein each of said processors address a common base node when referring to microkernels, the computer program product comprising:

a computer-readable storage medium; and a computer program stored on the computer-readable storage medium, the computer program comprising:

means for parsing the bit sequence of a memory address pointed to by a memory reference made by a processor, the bit sequence including (1) a destination node identifier and (2) a destination nodal address in said destination node;

means for recognizing a memory reference as a microkernel reference when the destination nodal address is in address space reserved for storing microkernels in nodes; and means for transforming the destination node identifier on a microkernel reference to an identifier of a local node storing the microkernel to which the microkernel reference refers.

7. The computer program product of claim 6, in which the computer program further comprises:

means for reporting a program error if, prior to being transformed into an identifier of a local node, the destination node identifier of a microkernel reference does not identify the base node.

8. The computer program product of claim 6, in which the computer program further comprises:

means for transforming the local node identifier back to the destination node identifier prior to processing a cache coherency request when said cache coherency request is made to said processor.

* * * * *